(12) United States Patent
Keshavan

(10) Patent No.: US 9,177,579 B2
(45) Date of Patent: Nov. 3, 2015

(54) SINGLE-PIECE YOKE DAMPER FOR VOICE COIL ACTUATOR

(71) Applicant: HGST Netherlands B.V., Amsterdam (NL)

(72) Inventor: Manoj B. Keshavan, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 28 days.

(21) Appl. No.: 14/081,872

(22) Filed: Nov. 15, 2013

(65) Prior Publication Data

US 2015/0138674 A1    May 21, 2015

(51) Int. Cl.
*G11B 21/02* (2006.01)
*G11B 5/55* (2006.01)
*H02K 33/16* (2006.01)
*H02K 41/035* (2006.01)

(52) U.S. Cl.
CPC .............. *G11B 5/5565* (2013.01); *H02K 33/16* (2013.01); *H02K 41/0358* (2013.01)

(58) Field of Classification Search
CPC ...... G11B 33/08; G11B 21/02; G11B 5/5573; G11B 5/5565; H02K 33/16; H02K 41/0358
USPC ..................... 360/265, 265.8, 97.19
See application file for complete search history.

(56) References Cited

U.S. PATENT DOCUMENTS

| | | | |
|---|---|---|---|
| 4,728,831 A * | 3/1988 | Cheng | 310/13 |
| 5,907,452 A | 5/1999 | Kan | |
| 6,377,145 B1 | 4/2002 | Kumagai | |
| 6,377,420 B1 | 4/2002 | Tadepalli et al. | |
| 6,563,676 B1 * | 5/2003 | Chew et al. | 360/264.7 |
| 6,879,466 B1 | 4/2005 | Oveyssi et al. | |
| 6,937,444 B1 * | 8/2005 | Oveyssi | 360/265.8 |
| 6,947,260 B2 | 9/2005 | Dominguez et al. | |
| 7,119,993 B2 | 10/2006 | Zuo et al. | |
| 7,489,480 B2 * | 2/2009 | Gong et al. | 360/265.9 |
| 7,675,714 B1 * | 3/2010 | Yucesan et al. | 360/265.8 |
| 7,848,058 B2 * | 12/2010 | Huang et al. | 360/265.8 |
| 7,859,795 B2 * | 12/2010 | Kerner et al. | 360/244.9 |

(Continued)

FOREIGN PATENT DOCUMENTS

| | | | | |
|---|---|---|---|---|
| JP | 59171077 | A | * | 9/1984 |
| JP | 62102487 | A | * | 5/1987 |
| JP | 03183348 | A | * | 8/1991 |

OTHER PUBLICATIONS

Sage Journals, "Effect of the Pivot Assembly on the Dynamic Behaviour of a Head Actuator in Hard Disk Drives", Proceedings of the Institution of Mechanical Engineers, Part C: Journal of Mechanical Engineering Science, Apr. 1, 2001, vol. 215, No. 4, pp. 461-467, URL: http://intl-pic.sagepub.com/content/215/4/461.abstract.

(Continued)

*Primary Examiner* — Will J Klimowicz
(74) *Attorney, Agent, or Firm* — John D. Henkhaus

(57) ABSTRACT

Approaches to improving actuator settle time by damping vibrations resulting from coil modes, such as with a voice coil actuator in a hard disk drive, include a single-piece damper plate coupled to the voice coil actuator yoke. The damper plate may be a single U-shaped piece of metal that covers the area of the yoke that experiences the maximum strain energy during operation, between the voice coil and the pivot bearing housing.

16 Claims, 2 Drawing Sheets

(56) References Cited

U.S. PATENT DOCUMENTS

| | | | |
|---|---|---|---|
| 7,929,245 B2* | 4/2011 | Hanrahan | 360/97.19 |
| 7,990,657 B2 | 8/2011 | Fu et al. | |
| 8,068,309 B2* | 11/2011 | MacKinnon et al. | 360/97.19 |
| 8,134,808 B2* | 3/2012 | Kim et al. | 360/264.7 |
| 8,189,298 B1* | 5/2012 | Lee et al. | 360/264.7 |
| 8,305,714 B2 | 11/2012 | Suzuki et al. | |
| 2004/0095682 A1* | 5/2004 | Dominguez et al. | 360/265 |

OTHER PUBLICATIONS

Blount, Walker C., "Noise Reduction Using Dampening in Voice Coil Motors/Actuators of Hard Disk Drives", IBM, IBM Storage Technology, Oct. 2001, pp. 1-6, URL: https://www2.hgst.com/hdd/library/noise.pdf.

* cited by examiner

SINGLE-PIECE YOKE DAMPER FOR VOICE COIL ACTUATOR

FIELD OF THE INVENTION

Embodiments of the invention relate generally to hard disk drives and more particularly to improving actuator settle time.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present holy grails of hard disk drive design evolution. In turn, as recording tracks in HDDs become narrower and narrower, there is a need for more accurate and sustainable head positioning. Furthermore, especially in the case of enterprise-class HDDs, customers mandate meeting stringent performance requirements. One of the main factors impairing faster, more accurate head positioning are modes of vibration associated with the actuator that positions the head over the disk. Thus, the manner in which vibration modes are managed is an important factor in improving the performance and reliability of HDDs.

SUMMARY OF EMBODIMENTS

Embodiments of the invention are directed to improving actuator settle time by damping vibrations resulting from coil modes, such as with a voice coil actuator in a hard disk drive. According to embodiments, a single-piece damper plate is coupled to the voice coil actuator yoke of a hard disk drive (HDD). According to embodiments, the damper plate is a single U-shaped piece of metal that covers the area of the yoke that experiences the maximum strain energy during operation, between the voice coil and the pivot bearing housing. The single-piece configuration is more optimal in dissipating strain energy through shearing of the visco-elastic material than having multiple separate dampers. Thus, manufacturing costs are reduced by reducing HDD parts count and manufacturing process steps, as compared to previous multi-piece damper designs.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to improving actuator settle time by damping vibrations resulting from coil modes are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
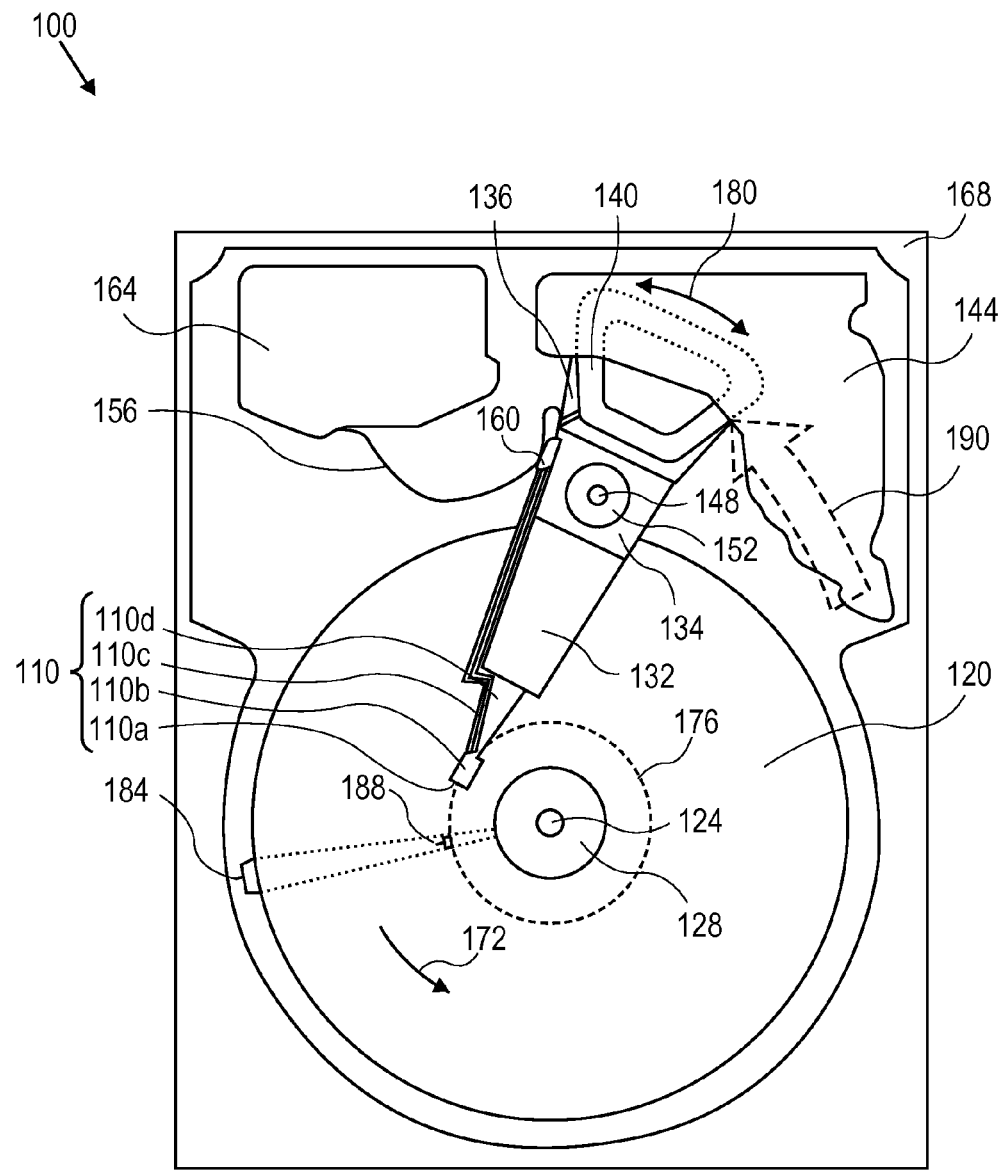
FIG. 1 is a plan view of a hard disk drive, according to an embodiment of the invention.

Embodiments of the invention may be used in the context of damping vibrations resulting from coil vibration modes, such as with a voice coil actuator in a hard disk drive (HDD). A plan view illustrating an HDD 100 is shown in FIG. 1. FIG. 1 illustrates an example of the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet. The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

INTRODUCTION

Hard disk drives (HDDs), especially enterprise class HDDs, need to meet stringent requirements for performance and reliability. Higher performance dictates that the actuator seek fast to the desired data track and reliability dictates that data on an adjacent track not be over-written during write operations. Both of these requirements lead to a desire for the actuator to settle on track in the shortest time possible with minimal residual vibration. Thus, reducing actuator settle time by damping out vibrations resulting from coil modes (e.g., coil bending and coil torsion) is desirable.

One known solution to reducing actuator settle time involves slowing down the actuator move time. However, that results in decreased performance. Another known solution is to use multi-piece yoke dampers, but that involves multiple different dampers with different part numbers that need to be installed separately. Therefore, neither of these known solutions is considered ideal and embodiments of the invention are directed to reducing actuator settle time by damping vibrations resulting from coil modes.

Voice Coil Actuator Having Single-Piece Yoke Damper

Figure 2:
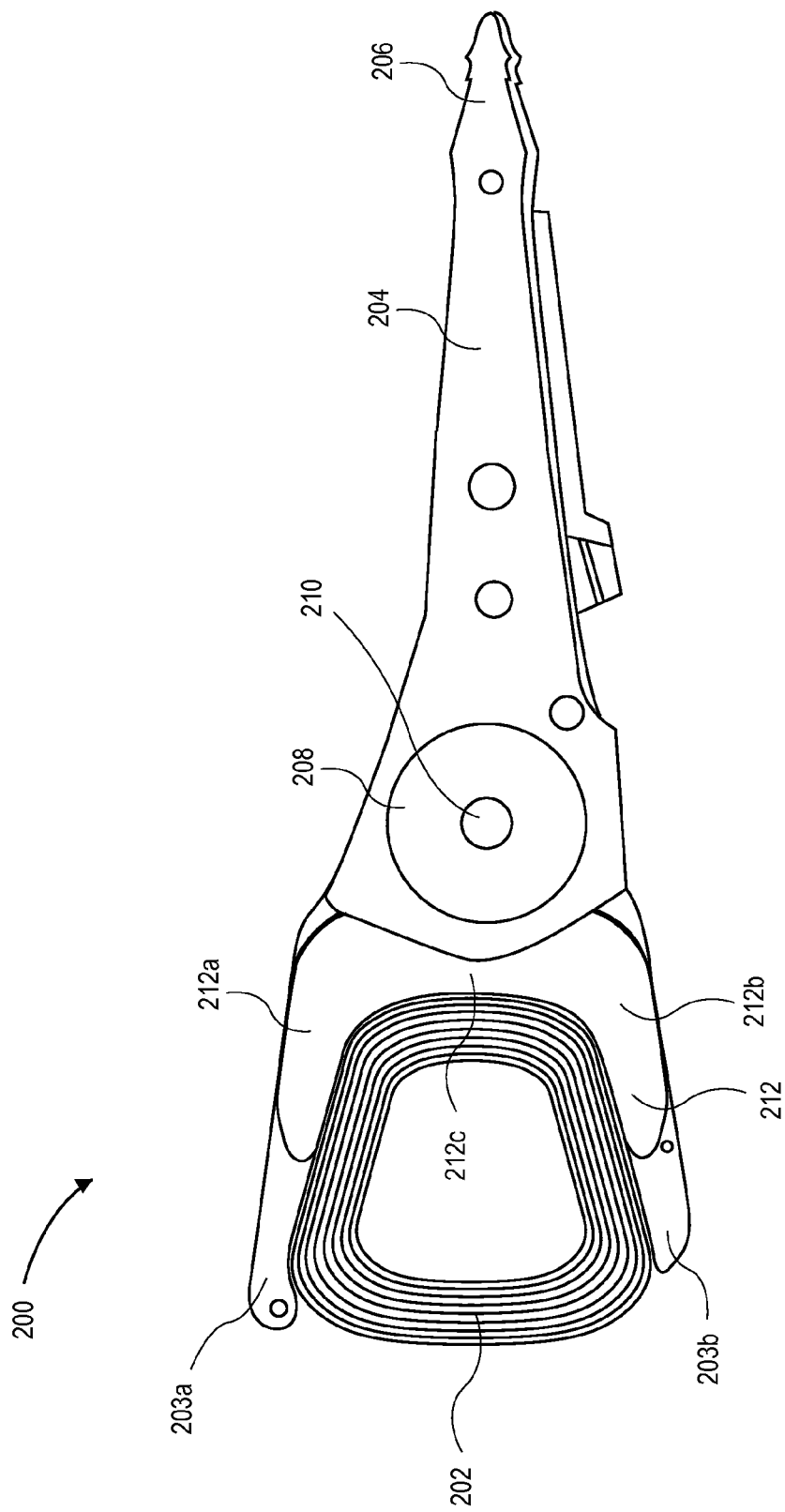
FIG. 2 is a plan view of a voice coil actuator, according to an embodiment of the invention.

FIG. 2 is a plan view of a voice coil actuator, according to an embodiment of the invention. Voice coil actuator 200 comprises a yoke, which includes coil-supporting arm 203a and coil-supporting arm 203b that support a wire coil 202. Operation of the voice coil actuator rotates a head stack assembly (HSA), including an arm 204 and a head-gimbal assembly (HGA) 206, about a pivot-shaft 210 via a pivot-bearing 208. The configuration and operation of voice coil actuator 200 is the same as or similar to like components described in reference to FIG. 1, with an additional component described hereafter.

Voice coil actuator 200 further comprises a single-piece damper plate 212. Damper plate 212 is configured with an inner leg 212a, an outer leg 212b, and a middle leg 212c spanning between the inner and outer legs in a continuous structure, which may be considered a generally U-shaped formation. Depending on the shape of the support structure or housing surrounding the pivot bearing 208, damper plate 212 may be configured with an inner leg 212a, an outer leg 212b, and a middle leg 212c spanning between the inner and outer legs in a continuous structure, which may be considered a generally W-shaped formation. Regardless, damper plate 212 is a continuous piece of metal that covers the area of the yoke that experiences the maximum strain energy during operation, which is the area of the yoke near or adjacent to the pivot bearing 208 housing where coil-supporting a 203a and coil-supporting arm 203b meet.

Damper plate 212 functions on the principle of constrained layer damping. The damper consists of a visco-elastic adhesive (damping material) bonded to a stiff material (constraining layer). The damper plate 212 is applied to the yoke structure in a region of high strain energy for the mode(s) (bending and torsion) to be damped, and the structure and the damper together form a constrained layer damping system for the voice coil actuator 200 assembly. Damping is achieved by dissipation of the vibration energy into heat through a shearing of the visco-elastic layer.

Use of a single-piece damper plate 212 provides roughly equivalent damping for the primary coil modes of interest, i.e., bending and torsion, as a configuration that uses four separate damping plates, such as disclosed in U.S. Pat. No. 7,990,657 ("'657") Since the '657 design involves four different dampers (with different part numbers), the cost of the damper is about four times higher and, more significantly, the dampers are not attached in the region of maximum strain energy.

Single-piece damping plate 212 also should provide more strength and rigidity than a configuration using four separate damping plates. According to an embodiment, a non-magnetic stainless steel is used to form damping plate 212, rather than aluminum. According to an embodiment, 305 stainless steel is used to form damping plate 212. Use of 305 stainless steel goes beyond a simple design choice because it eliminates the need for nickel plating traditional aluminum damper plates, thereby saving cost and lessening the potential of HDD contamination from the release of nickel plating particles from the aluminum plate. In this context use of 305 stainless steel is more effective than 304 stainless steel, for example, because 304 stainless has a tendency to become slightly magnetic.

Furthermore, because steel is stronger and stiffer than aluminum, the thickness of damper plate 212 may be decreased from a thickness used for a multi-piece nickel-plated aluminum. For example, a stainless steel damper plate 212 with a thickness of 2 mils may be used instead of a nickel-plated aluminum damper plate with a thickness of 3 mils, providing a reduction in thickness of 50%. Consequently, the voice-coil magnet of the stator 144 (FIG. 1) of the voice-coil motor (VCM) can be positioned even closer to the coil 202, which enables the generation of more force from the VCM.

Damper plate 212 is shown coupled to the top surface of the yoke. Alternatively, damper plate 212 may be implemented in a position coupled to the bottom surface of the yoke. Further, two damper plates such as damper plate 212 may be implemented, one coupled to the top surface of the yoke and one coupled to the bottom surface of the yoke, which would be even more effective than the known four piece configuration. Use of two damper plates 212 coupled to the top and bottom surfaces of the yoke may become a more feasible and optimal design as HDD areal density increases and even better settle time is desired.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A voice coil actuator comprising:
a wire coil configured to carry electrical current;
a yoke supporting said coil; and
a single-piece damper plate coupled to said yoke, said damper plate comprises an inner leg, an outer leg, and a middle leg spanning between said inner and outer legs in a continuous and substantially U-shape;
wherein said damper plate is a continuous piece of metal that covers only said yoke in a region that experiences maximum strain energy associated with the bending and torsion modes of said coil during operation of said voice coil actuator.

2. The voice coil actuator of claim 1, wherein said damper plate is coupled to the top surface of said yoke.

3. The voice coil actuator of claim 1, wherein said damper plate is coupled to the bottom surface of said yoke.

4. The voice coil actuator of claim 1, wherein said damper plate is a first damper plate coupled to a first surface of said yoke, said voice coil actuator further comprising:
a second substantially U-shaped damper plate coupled to a second surface of said yoke opposing said first surface.

5. The voice coil actuator of claim 1, wherein said damper plate is formed of non-magnetic stainless steel.

6. The voice coil actuator of claim 1, wherein said damper plate is formed of 305 stainless steel.

7. The voice coil actuator of claim 6, wherein said damper plate is approximately 2 mils thick.

8. The voice coil actuator of claim 1, further comprising:
a pivot bearing housing; and
wherein said damper plate is coupled only to said yoke between said coil and said pivot bearing housing.

9. A hard disk drive (HDD), comprising:
a head slider comprising a magnetic write head;
an arm, to which said head slider is coupled;
a magnetic-recording disk rotatably mounted on a spindle;
a voice coil motor (VCM) configured to move the arm and head slider to access portions of the magnetic-recording disk, said VCM comprising:
a wire coil configured to carry electrical current;
a yoke supporting said coil; and
a single-piece damper plate coupled to said yoke, said damper plate comprises an inner leg, an outer leg, and a middle leg spanning between said inner and outer legs in a continuous and substantially U-shape;
wherein said damper plate is a continuous piece of metal that covers only said yoke in a region that experiences maximum strain energy associated with the bending and torsion modes of said coil during operation of said voice coil motor.

10. The HDD of claim 9, wherein said damper plate is coupled to the top surface of said yoke.

11. The HDD of claim 9, wherein said damper plate is coupled to the bottom surface of said yoke.

12. The HDD of claim 9, wherein said damper plate is a first damper plate coupled to a first surface of said yoke, said VCM further comprising:
a second substantially U-shaped damper plate coupled to a second surface of said yoke opposing said first surface.

13. The HDD of claim 9, wherein said damper plate is formed of non-magnetic stainless steel.

14. The HDD of claim 9, wherein said damper plate is formed of 305 stainless steel.

15. The HDD of claim 14, wherein said damper plate is approximately 2 mils thick.

16. The HDD of claim 9, said VCM further comprising:
a pivot bearing housing; and
wherein said damper plate is coupled only to said yoke between said coil and said pivot bearing housing.

* * * * *